United States Patent
Pettersson et al.

(10) Patent No.: US 8,370,027 B2
(45) Date of Patent: Feb. 5, 2013

(54) PREVENTIVE AND PERSUASIVE ACTIONS AGAINST DRUNK DRIVING

(75) Inventors: Hakan Pettersson, Floda (SE); Bertil Hok, Vasteras (SE)

(73) Assignee: Autoliv Development AB, Vargarda (SE)

( * ) Notice: Subject to any disclaimer, the term of this patent is extended or adjusted under 35 U.S.C. 154(b) by 282 days.

(21) Appl. No.: 12/744,294

(22) PCT Filed: Nov. 23, 2007

(86) PCT No.: PCT/SE2007/050896
§ 371 (c)(1),
(2), (4) Date: May 21, 2010

(87) PCT Pub. No.: WO2009/067064
PCT Pub. Date: May 28, 2009

(65) Prior Publication Data
US 2010/0268425 A1  Oct. 21, 2010

(51) Int. Cl.
*G06F 17/00* (2006.01)
*B60K 28/06* (2006.01)

(52) U.S. Cl. .................. 701/45; 180/272; 180/287
(58) Field of Classification Search ............ 701/45; 180/272, 287
See application file for complete search history.

(56) References Cited

U.S. PATENT DOCUMENTS
4,592,443 A  6/1986  Simon
7,227,472 B1 6/2007  Roe

FOREIGN PATENT DOCUMENTS
EP  0542621 A1  5/1993
KR  200600112868  9/2006

OTHER PUBLICATIONS
International Search Report of PCT/SE2007/050896 (WO 2009/067064 A1) with Written Opinion; Aug. 27, 2008.

*Primary Examiner* — Eric Culbreth
(74) *Attorney, Agent, or Firm* — Brinks Hofer Gilson & Lione

(57) ABSTRACT

A vehicle safety system is provided that includes an alcohol concentration determining arrangement. A control unit is adapted to receive and analyze data from the alcohol concentration determining arrangement and output a blocking signal or a dissuasion signal under certain conditions. A blocking arrangement is adapted to prevent driving of the vehicle by the vehicle occupant upon receipt of a blocking signal. An output device is adapted to receive the dissuasion signal and to present a warning to the vehicle occupant to dissuade the occupant from driving the vehicle. The control unit is operable to categorize the concentration of alcohol in the occupant's blood into one of three categories: a low concentration category, in which the blocking signal will not be generated, a high concentration category, in which the blocking signal will be generated, and an intermediate category, in which the dissuasion signal will be generated.

8 Claims, 2 Drawing Sheets

US 8,370,027 B2

PREVENTIVE AND PERSUASIVE ACTIONS AGAINST DRUNK DRIVING

CROSS REFERENCE TO RELATED APPLICATIONS

This application claims priority to PCT patent application PCT/SE2007/050896 filed Nov. 23, 2007.

FIELD OF THE INVENTION

The present invention relates to methods and system designed to present traffic accidents due to drunk driving. More specifically, the invention relates to systems and methods employing breath analysis to detect the presence and concentration of alcohol.

BACKGROUND OF THE INVENTION

In Anglo-American nomenclature, a device utilizing breath analysis to detect alcohol and acting on the results are normally referred to as an alcohol interlock, or by the shorter term "alcolock." The preventive effect of these devices have been demonstrated, along with several positive side effects, especially for the rehabilitation of drivers already convicted for drunk driving, and as a tool for quality assurance of transportation services.

The typical purpose of an alcohol interlock is to prevent drunk driving. Technically, this is implemented by disabling the start of the engine, unless a breath sample with little or no alcohol concentration has been provided. A drunken person with affected driving capability and judgement is thus physically prevented from driving, thereby eliminating possible damage to life and property caused by driving influenced by alcohol. The concentration limit used to determine whether the alcohol interlock enables or disables the vehicle, also called "blocking" or "unblocking", normally coincides with the legal limit of alcohol consumption allowed for driving.

Regardless of their obvious merits, the idea of alcohol interlocks is somewhat controversial from the point of view of personal integrity and responsibility. A vehicle owner may perceive the alcohol interlock as restricting access to private property, and hence an infringement on personal integrity. In addition, a person accused of drunk driving may claim at least partial irresponsibility, if his or her vehicle was equipped with an alcohol interlock and was still drivable. Both issues of integrity and responsibility touch upon the possibility of false blockings and unblockings.

Suppliers of alcohol interlocks are vague about the influence of inevitable measurement errors, which cause false outputs at a rate depending on the error magnitude. A highly precise instrument will give rise to few false outputs. If many drivers make use of this precision to drive slightly below the limit rather than refraining from driving, the number of intoxicated drivers may increase rather than decrease, thus partly undermining the purpose of alcohol interlocks. On the other hand, a device with a large error will frequently block falsely. If routes to circumvention are introduced to alleviate this problem, the main purpose will again be undermined.

Cost, inconvenience and time consumption are common additional arguments against alcohol interlocks, especially from drivers who are moderate consumers of alcohol. The possibility of circumvention or manipulation, for example, by asking someone else to provide the breath sample or bypassing the interlock, is another problem.

SUMMARY OF THE INVENTION

In one aspect of the present invention, a vehicle safety system is provided that includes an alcohol concentration determining arrangement for making a determination as to the concentration of alcohol in the blood of a vehicle occupant. The system also includes a control unit adapted to receive and analyze data from the alcohol concentration determining arrangement, and based upon the results of the analysis, output a blocking signal or a dissuasion signal. In some embodiments, the systems may further include a blocking arrangement adapted to receive the blocking signal and to prevent driving of the vehicle by the vehicle occupant and an output device adapted to receive the dissuasion signal and to present one or more warnings to the vehicle occupant to dissuade the occupant from driving the vehicle. The control unit may be operable to categorize the concentration of alcohol in the occupant's blood into one of three categories. Three categories may include, for example, a low concentration category, in which the blocking signal will not be generated, a high concentration category, in which the blocking signal will be generated, and an intermediate category, in which the blocking signal will not be generated and the dissuasion signal will be generated.

In some forms, the alcohol concentration determination arrangement is configured to analyze a sample of the occupant's breath. The warning output by the output device may include auditory, visual and/or haptic stimulation. The output of the output device may include illumination of a light source, the generation of a sound, the generation of a verbal message, the display of text, and/or vibratory stimulation of a part of the driver's body. In addition, the output of the output device may vary depending upon the concentration of alcohol in the occupant's blood.

In another aspect of the present invention, a method of controlling vehicle systems is provided. The method includes steps of determining a concentration of alcohol in the blood of a vehicle occupant and categorizing the concentration of alcohol in the occupant's blood into at least one of three categories, including a low concentration category, an intermediate category, and a high concentration category. If the determined concentration of alcohol in the blood of the occupant falls into the high concentration category, the disclosed method prevents the driving of the vehicle by the occupant. If the determined concentration of alcohol in the blood of the occupant falls into the intermediate category, the disclosed method includes allowing the vehicle occupant to drive the vehicle, and presenting one or more warnings to the vehicle occupant to dissuade the occupant from driving the vehicle.

In some forms, if the concentration of alcohol in the occupant's blood is determined to fall into the low category, the warnings are not presented to the vehicle occupant. A computer program comprising computer program code may be implemented to apply the steps of the disclosed method. The computer program may be embodied on a computer readable medium.

In another aspect of the present invention provides a method and system for the prevention and persuasion of driving a vehicle under the influence of alcohol is provided that includes the control of drivability of a vehicle into at least three categories. The categories include unrestricted unblocking, restricted unblocking, and blocking, respectively, based on the passing of system self-test, the approval of breath sample, and on the alcohol concentration of the breath sample being correspondingly categorized into low, moderate and high.

The system self-test may include means to differentiate between several categories of technical errors and attempts at circumvention or manipulation, leading to different categories of drivability. For example, unprovoked technical error could be configured to lead to the category of restricted unblocking, whereas attempts at circumvention or manipulation could be configured to lead to the category of blocking.

Furthermore, the category of restricted drivability could include means for persuasion or discomfort, for example, by auditory, visual and/or haptic stimulation intended to provoke the attention of the driver with intensity and persuasiveness increasing with increasing alcohol concentration. Based on the amount of elapsed time from the breath sample acceptance, for example, the means for persuasion or discomfort could be exerted by a flashing source of light, a high-intensity tone of sound at audible frequency or infrasound, verbal message urging the person to stop the vehicle, communicated as display text or by artificial voice, vibratory means exerted at or within the driver's seat, and/or the activation of a warning blinker intended to provoke the attention of other road-users.

In some variations, first and second distinct limit values of breath alcohol concentration may be defined to separate categories of concentration, because at the category of moderate concentration, significant reduction of capability to handle critical traffic situations in a normal person is known to occur, and at the category of high concentration, significant impairment of judgment is known to occur. The first and second limit values may be defined to differ by at least a factor of two, and to coincide with common legal concentration limits. For example, the first and second operational limits may be 0.1 and 0.25 mg/l, respectively.

In some forms, the present invention provides a probability of false blockings/unblockings that does not exceed 1%.

The breath sample approval may be determined by measurements performed at or in the close vicinity of the mouth of the person, indicating a source of air with alveolar composition with respect to carbon dioxide concentration, humidity, temperature or any combination of these entities, including timing relations. The breath sample approval may be influenced by signals indicating conditions of the vehicle, including opening/closure of the main lock of the vehicle, opening/closure of door to driver's seat, attachment/detachment of driver's seat belt, and/or position of the ignition key.

In some variations, determination of the alcohol concentration may be based on the measurement of infrared absorption within a wavelength interval known to possess absorption properties specific to alcohol. Drivability may be controlled by actuation onto the ignition key, solenoid, start motor, fuel injection unit, steering wheel, or gear control of the vehicle.

The category of unprovoked errors may be localized to the internal hardware or software of the system, whereas said category of provoked errors may be localized to the boundaries of the system, with respect to the vehicle system, the sensors, or the user interface.

In some forms of the present invention, the sensor unit may include sensor elements configured to respond to alcohol concentration, and any combination of tracer signals of carbon dioxide concentration, humidity and temperature. A computational unit may be provided that includes means for the execution of pre-programmed arithmetic, logical and sequential operations. A memory unit may be provided for temporary or permanent storage of information. A user communication unit may be provided for the display or transfer of information relevant to the driver and receiving input control signals from the driver. A vehicle interface may be provided for signal transfer between the computational units. An actuator unit may be provided for the control of the drivability categories.

The system may further include a housing adapted for single-hand operation by the driver. The housing may accommodate, for example, the sensor and user communication units, and a docking station for permanent positioning of the housing between occasions of use. The docking station may include a power module and may be an integrated part of instrument panel of the vehicle. In some forms, the sensor and user communication units may be an integrated part of the steering wheel of the vehicle. In some variations, a pocket-sized handheld unit may include the sensor and communication units, which may include wireless signal communication to the vehicle. Wireless signal communication may occur within the parts of the system according to industrial standards, for example, Bluetooth, ZigBee, or RKE.

BRIEF DESCRIPTIONS OF THE DRAWINGS

In order that the present invention may be more readily understood, embodiments thereof will now be described, by way of example, with reference to the accompanying drawings, in which.

DETAILED DESCRIPTIONS OF THE INVENTION

Figure 1:
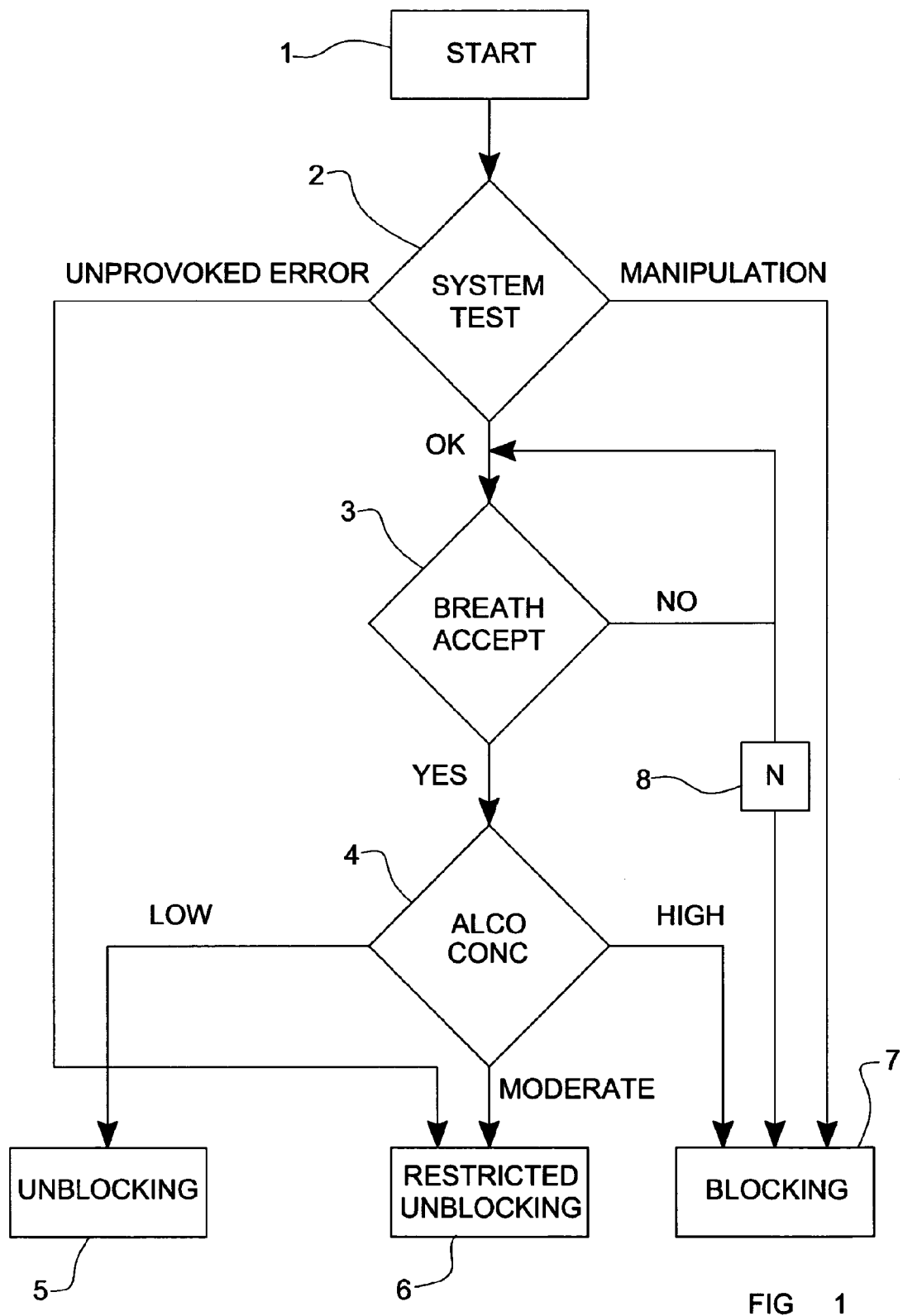
FIG. 1 is a flow diagram illustrating the sequence of events for the determination of categories according to an embodiment of the present invention.

In accordance with embodiments of the present invention, a third category of drivability is introduced between the blocking and unblocking conditions. The third category includes restricted unblocking, which includes a condition in which a moderately intoxicated driver is persuasively informed about the reason for the restriction and urged to take an informed decision whether to interrupt the driving operation or not. The reason could be moderate alcohol intoxication revealed by the previous breath test, but could also be due to some unprovoked technical error.

The three categories of drivability of the present invention may be linked to corresponding categories of alcohol concentration within a breath sample provided by the driver: low, moderate and high concentration. By high concentration is meant a level of intoxication at which a person's judgment is significantly affected. At the other extreme, low concentration, neither a person's driving capacity nor his/her judgment are significantly reduced by intoxication. At moderate concentrations, the driver's ability to handle critical traffic situations is likely to be reduced, however, with remaining sense of judgment, including receptivity to persuasion.

The influence of alcohol on behavior and capabilities varies from one person to another, and may also vary from one occasion to another in any individual person. On the other hand, a device controlling drivability of a vehicle should preferably operate on the basis of clearly defined limit values separating the three categories of breath alcohol concentration. Preferably, the first and second limit values separating the three categories differ by a factor of two or more, and coincide with established legal concentration limits.

In Sweden, vehicle driving is prohibited above a breath alcohol concentration of 0.1 mg/l, which approximately corresponds to a blood concentration of 0.02%. In several European countries, the corresponding legal limit in terms of breath alcohol concentration is 0.25 mg/l. An international trend towards decreasing concentration limits can be noted.

In the present invention, the preferred first concentration limit between low and moderate concentration is set at 0.1 mg/l, whereas the second concentration limit separating the moderate and high concentrations is preferably set at 0.25 mg/l.

In the following text, blockings are defined as false when they occur for a driver with zero alcohol concentration. Correspondingly, false unblockings are defined as those occurring in a driver with alcohol concentration at or above the concentration limit (CL), equaling the limit between moderate and high alcohol concentration, that is the transition between the unblocking and blocking conditions.

The probability of false blockings and unblockings is closely related to measurement errors, and to the location of the trigger level. If the error distribution is symmetric, and false blockings and unblockings are equally undesirable, the trigger level should be located at half the concentration limit, resulting in equal probabilities of false blockings and unblockings. For a normal error distribution with standard deviation σ, the probability of blocking, PB as a function of the alcohol concentration X normalized to CL can be determined by integrating the error distribution function:

$$PB(X) = \frac{1}{\sqrt{2\pi}} \int_{-\infty}^{X/\sigma} e^{\left(\frac{x-CL/2}{\sigma}\right)^2} dx \quad (1)$$

The probability of unblocking PU(X) is simply:

$$PU(X) = 1 - PB(X) \quad (2)$$

Evidently, the probabilities of blocking and unblocking depend on the ratio between the concentration limit and the standard deviation, CL/σ. More specifically, the expression for the probability PF of false blockings becomes:

$$PF(CL/\sigma) = 1 - \frac{1}{\sqrt{2\pi}} \int_{0}^{CL/\sigma} e^{\left(\frac{x-CL/2}{\sigma}\right)^2} dx \quad (3)$$

For symmetry reasons, this probability may also be expressed in a form which more easily lends itself to numerical calculations:

$$PF(CL/\sigma) = 2 \cdot \left[1 - \frac{1}{\sqrt{2\pi}} \int_{-\infty}^{CL/\sigma} e^{\left(\frac{x-CL/2}{\sigma}\right)^2} dx\right] \quad (4)$$

Inserting numerical values into eq. (4), probabilities may be calculated for different ratios CL/σ. Combining the requirements on measurement error set by European industrial standard EN 50436-2 for alcohol interlocks with the Swedish legal limit results in CL/σ=3.3, and a false blocking/unblocking probability according to eq. (2) of $9.5*10^{-2}$. In the present embodiment of the invention, the concentration limit is extended by at least a factor of two, thus CL/σ=6.6. The corresponding false blocking/unblocking probability is $9.7*10^{-4}$, representing a reduction of approximately two orders of magnitude.

The dramatically reduced probability of false blockings/unblockings in this embodiment of the present invention will to a large extent neutralize the arguments against alcohol interlocks, including those concerning personal integrity, responsibility and undermining of purpose.

The introduction of a third category of driveability is also put to use for more intelligent handling of technical system errors and attempts at circumvention. For a comparatively complex system such as that of an alcohol interlock, the accumulated probability of technical system errors over the vehicle life cycle may become substantial.

In some embodiments of the present invention, a system self test is automatically executed in conjunction with each breath test. In the system self test, provoked or unprovoked errors may be distinguished from each other. Unprovoked errors may automatically set the vehicle into the restricted unblocking condition, for example, whereas a provoked error, attempts at circumvention, or manipulation may lead to a blocking condition. In both cases a specific error message may be communicated to the driver. The system self test may, in principle, include all functional elements of the alcohol interlock, and may thus provide adequate protection against circumvention, manipulation or misuse. Preferably, it may be functionally integrated with the breath sampling process with no time delay.

Furthermore, embodiments of the present invention may involve integration of system architecture. First, the functional devices may themselves be highly integrated using combinations of semiconductor technology developed for integrated circuits, MEMS (micro electro mechanical systems) devices, PSoC (programmable system on chip). Second, structures, components and subsystems already available within the vehicle may be put to use for the system implementation. The integrative approach may result in significant cost savings with respect to production, use and maintenance.

The present invention seeks to provide an essential refinement of the purpose, function and characteristics of alcohol interlocks. When implemented at an industrial scale, embodiments of the invention are expected to save human lives and property.

In the following, the term driver will be used to mean any person in control of a vehicle, irrespective of intention of, or actually, driving. The term road-user will be used to denote any passenger, or other person being potentially or actually influenced by the actions of the driver.

The flow diagram of FIG. 1 includes a starting condition 1 activated by a switch or other similar means. The switch may be coupled to the central lock of the vehicle, or the ignition key, but may alternatively be completely independent of the vehicle system. Immediately upon start, a system test 2 is performed. Normally no errors are detected, since the system is designed for high reliability, using high quality components and assembly procedures. However, in this embodiment when a system error is detected, it will either be categorized as an unprovoked error, outside the user's control, or as a possible result of some kind of manipulation. These cases will directly set the vehicle in restricted unblocking and blocking conditions 6 or 7, respectively.

The categorization of errors into provoked or unprovoked is based on basic criteria described in the table below.

TABLE

Categorization of technical errors.

| Localization | Mechanism | Category |
|---|---|---|
| External connections | Circuits shorted or opened | Provokable |
| Sensor "window" | Blocking, bypass | Provokable |
| Internal hardware | Component error Circuits shorted or opened | Unprovokable |
| Software | Coding error | Unprovokable |
| User interface | Non-compliance with instructions | Provokable |

The possibility of provoking error, or manipulating the system, is basically limited to the boundaries of the system with respect to the user and the vehicle system, which may be either located at external connections, the "window" represented by the sensors, and/or the user interface. Internal error sources related to either hardware or software, and are not easily provoked, unless introduced by intervention into design, programming, or maintenance routines normally inaccessible to the user.

Since the categorization of errors is based on rules as outlined in the table, it may be included in the system test. The detection of a system error will thus be shortly followed by its categorization into provoked or unprovoked, whereby a provoked error will result in blocking, and whereas an unprovoked error will result in restricted drivability.

In this embodiment, after passing the system test 2 with no errors, the driver is instructed to provide a breath sample 3 which will be analyzed with respect to one or more of duration, volume, flow, pressure, temperature, humidity, carbon dioxide concentration, or other characteristic properties of an exhaled breath sample from a human being. If a breath sample is not accepted, the driver will be instructed to make a new attempt. Repeated failures to deliver breath samples will be interpreted as attempts at manipulation, which will set the vehicle in the blocking condition 7. This is accomplished by counting the number of attempts, indicated as N and box 8 in FIG. 1. If accepted, the breath sample will be further analysed with respect to its alcohol concentration 4.

Breath sampling is preferably performed in the vicinity of the driver's mouth after instruction to perform a forced and extensive exhalation in order to ensure that deep lung air is included. A mouthpiece is not necessarily used for sampling, since the dilution of a breath sample obtained in free air may be determined by the simultaneous measurement of tracer signals, preferably carbon dioxide, humidity or temperature. Notably, the composition of alveolar air with respect to these entities is remarkably well-defined and stable. Furthermore, they possess specific timing properties resulting from the presence of dead space corresponding to the upper airways. At normal ambient conditions, temperature and humidity increase more rapidly than carbon dioxide at the onset of exhalation.

The analysis of alcohol concentration may be performed by means of sensing and computational elements. A preferred method is infrared transmission spectroscopy, in which a beam of infrared light is transmitted from a broadband source to a detector equipped with dispersive element enabling spectral analysis of the transmitted beam. The presence of alcohol within the transmission path provides a specific signature of the detected signal, allowing both substance identification and quantification. The signature is based on molecular properties of alcohol resulting in specific infrared absorption characteristics. Alternatively, alcohol concentration may be measured by electrochemical or semiconductor sensors, however, with lower specificity and reliability. Any other suitable arrangement for determining the concentration of alcohol in the occupant's blood may also or alternatively be used.

The alcohol concentration is categorised as low, moderate or high, depending on pre-programmed criteria. Low concentration will lead to the unrestricted unblocking condition 5, moderate concentration to the restricted unblocking category 6, and high to the blocking condition 7.

The category of restricted unblocking 6 will include means of persuasion or discomfort, by auditory, visual and/or haptic stimulation intended to provoke the attention of said driver. Preferably, the intensity and persuasiveness of these means will increase with increasing alcohol concentration, and elapsed time from the breath sample acceptance. The stimulation is, for example, exerted by a flashing source of light, a high-intensity tone of sound at an audible frequency or as infrasound, a verbal message urging a person to stop the vehicle, communicated as display text or by artificial voice, vibratory means exerted at or within the driver's seat, and the activation of a warning blinker intended to provoke the attention of other road-users.

In order to ensure that the breath sample is actually originating from the driver and not any other person, its acceptance is preferably influenced by signals indicating conditions of the vehicle, including opening/closure of main lock to the vehicle, opening/closure of the door to driver's seat, attachment/detachment of the driver's seat belt, and position of the ignition key. In modern vehicles, these signals are normally already present.

Figure 2:
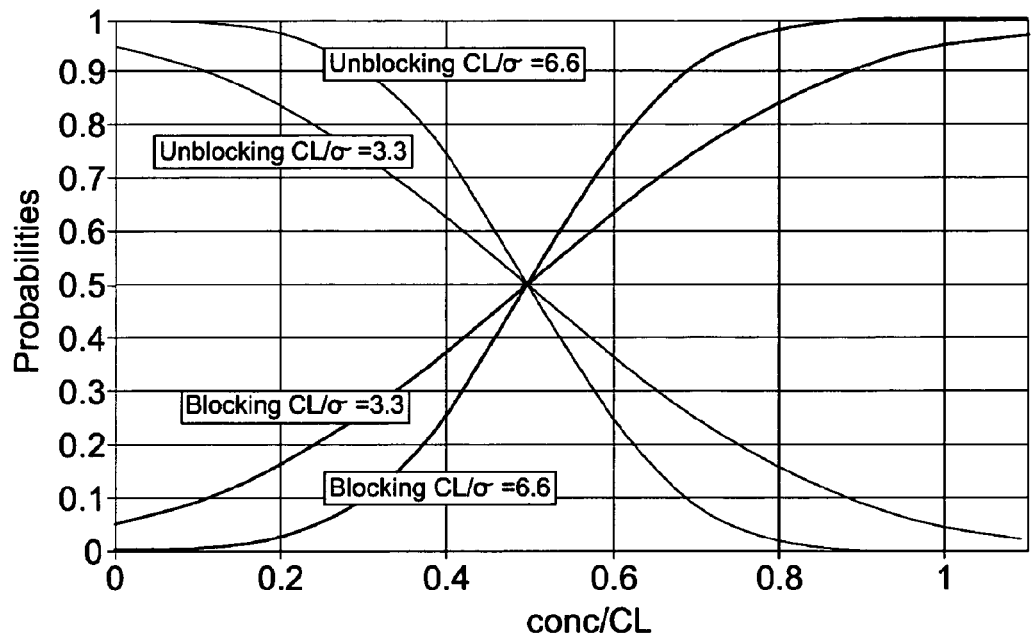
FIG. 2 is a graph of probabilities related to category attribution, in accordance with the principles of the present invention.

FIG. 2 is a graph showing the unblocking/blocking probabilities as a function of alcohol concentration normalized to CL. Curves for $CL/\sigma$ equaling 3.3 and 6.6 are included in the figure. As already inferred, $CL/\sigma=3.3$ corresponds to realistic performance and limit values. In the present invention, the corresponding $CL/\sigma$ will at least double to 6.6. The graphs shown in FIG. 2 were obtained from numerical calculation of Eq. (2). For $CL/\sigma=3.3$ and zero concentration, the blocking probability is approximately equal to 0.05, which is equal to the probability of unblocking at concentration=CL. These two probabilities add up to the total probability of false blockings/unblockings as already quoted above. From FIG. 2, a dramatic reduction in the probability of false blockings/unblockings when increasing $CL/\sigma$ from 3.3 to 6.6 is evident.

Figure 3:
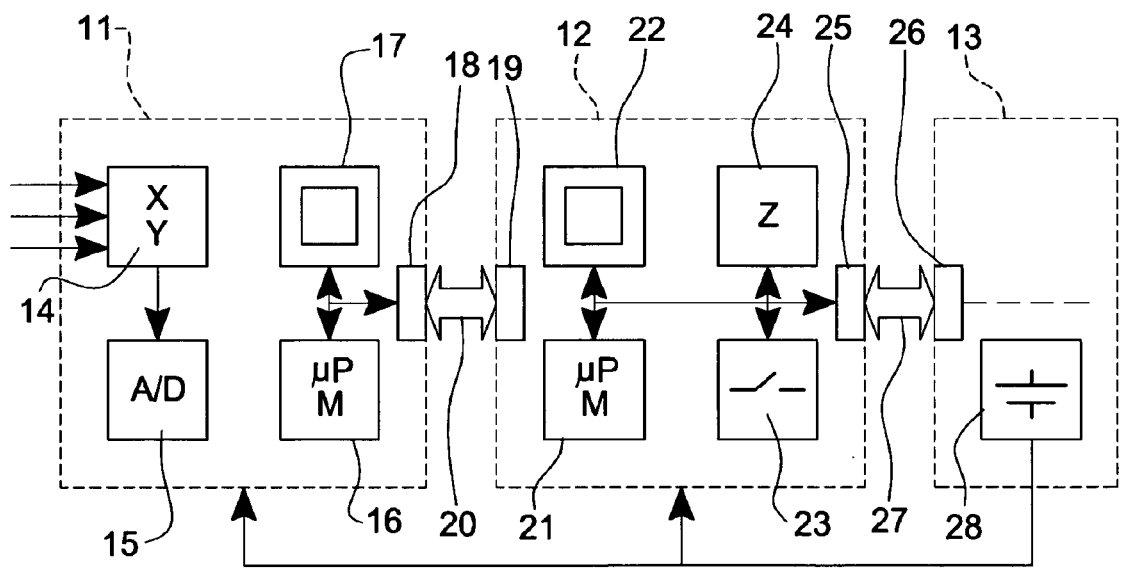
FIG. 3 is a schematic block diagram of the system architecture for use with embodiments of the present invention.

FIG. 3 schematically depicts the architecture of a system embodying the invention. Preferably, the system is comprised of two physically distinguishable block units: the driver interface unit 11, the vehicle interface unit 12, with electronic communication with the main vehicle system 13.

The driver interface unit 11 includes a sensor unit 14 with sensor elements responding to alcohol concentration, and any combination of carbon dioxide concentration, humidity and temperature of the breath sample. Preferably, alcohol, carbon dioxide and water vapor (humidity) concentration is measured in a single cavity traversed with infrared radiation from a broadband blackbody source radiator. Different bandpass interference or diffraction filters tuned to absorption bands specific to alcohol, carbon dioxide and water vapour, are being used in a multiple band infrared detector. The signal outputs from the detector represents concentration of each of these entities. Temperature may be measured using thermocouples or resistive temperature sensor(s).

Typically, the signals from the sensor unit 14 are analog voltages which require conversion into digital format in an analog to digital converter 15, before they are transferred to the computational unit 16. This unit includes means for the execution of pre-programmed arithmetic, logical and sequential operations, memory unit for temporary or permanent storage of information. The computational unit 16 is thus capable of executing the operations outlined in FIG. 1, provided that each operational step has been adequately defined, compiled and stored in the program memory.

Also included in the driver interface unit 11 in this embodiment is an output device in the form of a user communication unit 17 for the display or transfer of information relevant to the driver and receiving input control signals from the driver. The communication unit may also include means for audible or haptic signal communication.

The driver interface 11 accommodating sensor and user communication units 14 and 17 are preferably packaged in a housing adapted for single-hand operation by the driver. In a preferred embodiment, the sensor and user communication units 14 and 17 constitute integrated parts of the steering wheel of the vehicle. Signal and power lines are preferably in communication along the steering shaft. Alternatively, signals are communicated by wireless link, preferably using commonly accessed radio frequencies and protocols according to industrial standards, such as Bluetooth or ZigBee.

In this embodiment, the driver and vehicle interfaces 11 and 12 electronically communicate by means of interface circuitry 18, 19 via a communication channel 20. Preferably, the communication is performed in a serial digital format, and encoded in order to prevent manipulation. Basically, the vehicle interface unit 12 relays the communication between the driver interface 11 unit and the vehicle system 13 for the control of the drivability categories, and performs a supervisory system function in relation to the system self test described above. In order to execute this supervisory function, the vehicle interface is equipped with a computational unit 21, sensor and actuator units 23, 24, and a display unit 22.

In this embodiment, the vehicle interface 12 communicates with the vehicle system 13 by means of a communication channel 27, and interface circuitry 25, 26. Preferably, the communication channel 27 conforms to standards for vehicle signal communication, for example, by the CAN bus arrangement. Alternatively, signals are communicated by wireless link, preferably using commonly accessed radio frequencies and protocols according to industrial standards, such as Bluetooth or ZigBee.

The system according to the invention is preferably directly or indirectly powered from the main vehicle power supply 28. The direct powering makes use of permanent power lines to each active unit as illustrated in FIG. 3. Indirect powering may involve one or more rechargeable batteries built into one or several units, for example, in the driver interface 11.

Preferably, blocking of the driveability of the vehicle according to the category described above is controlled by actuation onto the ignition key, solenoid, start motor, fuel injection unit, steering wheel, or gear control. In order to make manipulation more difficult, actuation of more than one of these functions may be performed simultaneously, but differently at different occasions. The control of which functions are actuated at any one occasion is preferably stored in the program memory of the computational units 16 or 21.

The restricted unblocking category of drivability may be implemented by a number of persuasive signals directed to the driver. These signals may be activated via the user communication unit 17, or elements included in the vehicle unit 13, for example, the warning blinker.

The physical implementation of the system according to the invention may take several alternative forms. In a preferred embodiment, the driver interface unit is embedded into a housing adapted for single-hand operation by the driver. The housing is accommodating the sensor, computational and user communication units 14, 16, and 18. The housing is adapted to a docking station for permanent positioning between occasions of use. The docking station includes a power module and is an integrated part of the instrument panel of the vehicle. The docking station includes the vehicle interface unit 12.

In another preferred embodiment, the driver interface unit 11 is embedded within a pocket-sized handheld unit including sensor, computational and communication units 14, 16, 18. According to this embodiment, the pocket-sized unit communicates with the vehicle interface 12 via a wireless link, preferably using standard frequencies and protocols according to the industrial standards for remote keyless entry (RKE). In this case, simplex rather than duplex communication can be used, reducing cost and improving user friendliness.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A vehicle safety system, comprising:
   an alcohol concentration determining arrangement, for making a determination as to the concentration of alcohol in the blood of a vehicle occupant;
   a control unit adapted to receive and analyze data from the alcohol concentration determining arrangement to create an analysis, and in dependence upon the results of the analysis, the control unit being operable to output one of a blocking signal and a warning signal;
   a blocking arrangement, adapted to receive the blocking signal and to prevent driving of the vehicle by the vehicle occupant; and
   an output device adapted to receive the warning signal and to present at least one warning to the vehicle occupant; wherein:
   the control unit is operable to categorize the concentration of alcohol in the occupant's blood into one of three categories, the categories including a low concentration category, in which the blocking signal will not be generated, a high concentration category, in which the blocking signal will be generated, and an intermediate category, in which the blocking signal will not be generated and the warning signal will be generated;
   the control system being configured to automatically execute a system self-test in conjunction with each breath test, to distinguish provoked and unprovoked errors from each other; to categorize an unprovoked error in the intermediate category, and to categorize a provoked error in the high concentration category.

2. The system according to claim 1, wherein the alcohol concentration determination arrangement is operable to analyze a sample of the occupant's breath.

3. The system according to claim 1, wherein the warning presented by the output device comprises at least one of auditory, visual and haptic stimulation.

4. The system according to claim 3, wherein the warning of the output device comprises at least one of the following: illumination of a light source, generation of a sound, generation of a verbal message, display of text, and vibratory stimulation of a part of the driver's body.

5. The system according to claim 3, wherein the warning of the output device varies depending upon the concentration of alcohol in the occupant's blood.

6. A method of controlling vehicle systems, comprising:
   determining a concentration of alcohol in the blood of a vehicle occupant to identify a determined concentration;
   categorizing the concentration of alcohol in the occupant's blood into one of three categories, the categories including a low concentration category, an intermediate category, and a high concentration category;

preventing the driving of the vehicle by the occupant if the determined concentration of alcohol in the blood of the occupant is categorized in the high concentration category; and allowing the vehicle occupant to drive the vehicle and presenting at least one warning to the vehicle occupant if the determined concentration of alcohol in the blood of the occupant is categorized in the intermediate category;

automatically executing a system self-test, distinguishing provoked and unprovoked errors from each other;

categorizing an unprovoked error in the intermediate category, and categorizing a provoked error in the high concentration category.

7. The method according to claim 6 wherein, if the determined concentration of alcohol in the occupant's blood is categorized in the low category, a warning is not presented to the vehicle occupant.

8. A computer program embodied on a non-transitory computer-readable medium comprising computer program code configured to perform the following steps when the code is run on a computer:

determining a concentration of alcohol in the blood of a vehicle occupant to identify a determined concentration;

categorizing the concentration of alcohol in the occupant's blood into one of three categories, the categories including a low concentration category, an intermediate category, and a high concentration category;

preventing the driving of the vehicle by the occupant if the determined concentration of alcohol in the blood of the occupant is categorized in the high concentration category;

allowing the vehicle occupant to drive the vehicle and presenting at least one warning to the vehicle occupant if the determined concentration of alcohol in the blood of the occupant is categorized in the intermediate category; and not presenting a warning if the determined concentration of alcohol in the occupant's blood is categorized in the low category;

automatically executing a system self-test, distinguishing provoked and unprovoked errors from each other;

categorizing an unprovoked error in the intermediate category, and categorizing a provoked error in the high concentration category.

* * * * *